United States Patent
Noone et al.

(10) Patent No.: US 6,364,374 B1
(45) Date of Patent: Apr. 2, 2002

(54) METHODS AND DEVICES FOR JOINING PANELS

(76) Inventors: Michael J. Noone, 320 Midland Ave., Wayne, PA (US) 19087; Thomas J. Cuthbertson, 24 N. 4th Ave., Royersford, PA (US) 19468

(*) Notice: Subject to any disclaimer, the term of this patent is extended or adjusted under 35 U.S.C. 154(b) by 0 days.

(21) Appl. No.: 09/427,882

(22) Filed: Oct. 27, 1999

(51) Int. Cl.$^7$ ................................................ F16L 25/00
(52) U.S. Cl. .......................... 285/424; 285/405; 52/71; 52/582.1; 52/712; 403/283; 16/384; 138/158
(58) Field of Search ................................. 403/283, 170, 403/217, 345, 403, 382; 52/71, 582.1, 726.1, 702, 712; 285/405, 424, 47; 138/157–159; 16/384; 411/461; 248/225.11, 489, 317

(56) References Cited

U.S. PATENT DOCUMENTS

| | | | | |
|---|---|---|---|---|
| 343,340 A | * | 6/1886 | Remus | 16/384 X |
| 596,817 A | * | 1/1898 | Mallen | 285/424 X |
| 1,001,575 A | * | 8/1911 | Bade | 16/384 |
| 1,180,873 A | * | 4/1916 | O'Brien | 16/384 |
| 1,402,304 A | * | 1/1922 | Lord | 403/283 |
| 1,484,491 A | * | 2/1924 | Guterman | 138/159 X |
| 1,590,569 A | * | 6/1926 | Fisk | 138/158 X |
| 1,703,522 A | * | 2/1929 | Escobales | 16/384 X |
| 2,123,410 A | * | 7/1938 | Gawcett | 138/159 |
| 2,206,918 A | * | 7/1940 | Powell | 16/384 X |
| 2,227,570 A | | 1/1941 | Burson | 72/118 |
| 2,328,051 A | | 8/1943 | Bull | 20/4 |
| 2,333,026 A | * | 10/1943 | McDonough | 138/158 |
| 2,335,303 A | | 11/1943 | Olsen | 72/118 |
| 2,389,468 A | * | 11/1945 | Terry | 138/158 |
| 2,831,222 A | | 4/1958 | Anderson | 20/92 |
| 2,877,520 A | * | 3/1959 | Jureit | 403/283 |
| 2,916,054 A | * | 12/1959 | Callan | 138/157 X |
| 3,187,389 A | | 6/1965 | Anderson | 20/92 |
| 3,212,529 A | * | 10/1965 | Ullman et al. | 138/157 X |
| 3,483,587 A | * | 12/1969 | McCauley | 16/384 |
| 3,975,877 A | | 8/1976 | Walton | 52/282 |
| 3,988,869 A | | 11/1976 | Tuttle | 52/285 |
| 4,183,379 A | * | 1/1980 | Marquette et al. | 138/158 |
| 4,187,653 A | | 2/1980 | Kliewer, Jr. | 52/98 |
| 4,299,511 A | * | 11/1981 | Demers | 403/283 X |
| 4,442,649 A | * | 4/1984 | Brickhead et al. | 403/283 |
| 4,488,389 A | * | 12/1984 | Farmont | 403/283 X |
| 4,890,864 A | | 1/1990 | Anderson et al. | 285/121 |
| 5,240,292 A | | 8/1993 | Roszin | 285/53 |
| 5,553,961 A | * | 9/1996 | Olden | 403/283 X |
| 5,632,128 A | | 5/1997 | Agar | 52/489.2 |
| 5,644,883 A | | 7/1997 | Menchetti | 52/489.1 |
| 5,743,058 A | | 4/1998 | Boomsma | 52/481.2 |
| 5,783,268 A | | 7/1998 | Noonan et al. | 428/34.5 |
| 5,918,644 A | | 7/1999 | Haack et al. | 138/151 |
| 6,132,129 A | * | 10/2000 | Frazier | 403/219 |
| 6,272,796 B1 | * | 8/2001 | Metzler | 52/93.1 |

FOREIGN PATENT DOCUMENTS

| | | | | |
|---|---|---|---|---|
| GB | 1164807 | * | 9/1969 | 138/159 |

* cited by examiner

*Primary Examiner*—Teri Pham Luu
(74) *Attorney, Agent, or Firm*—Duane Morris LLP

(57) ABSTRACT

Methods and devices for joining two or more panels together are provided. The methods allow joining of panels of material such as glass fiber board, and are particularly useful for forming ducts or tubes. Fasteners provided have two planar members, joined together, and the planar members have protrusions that are integral to the planar members and are intended to at least partially protrude the panels joined by the devices.

19 Claims, 3 Drawing Sheets

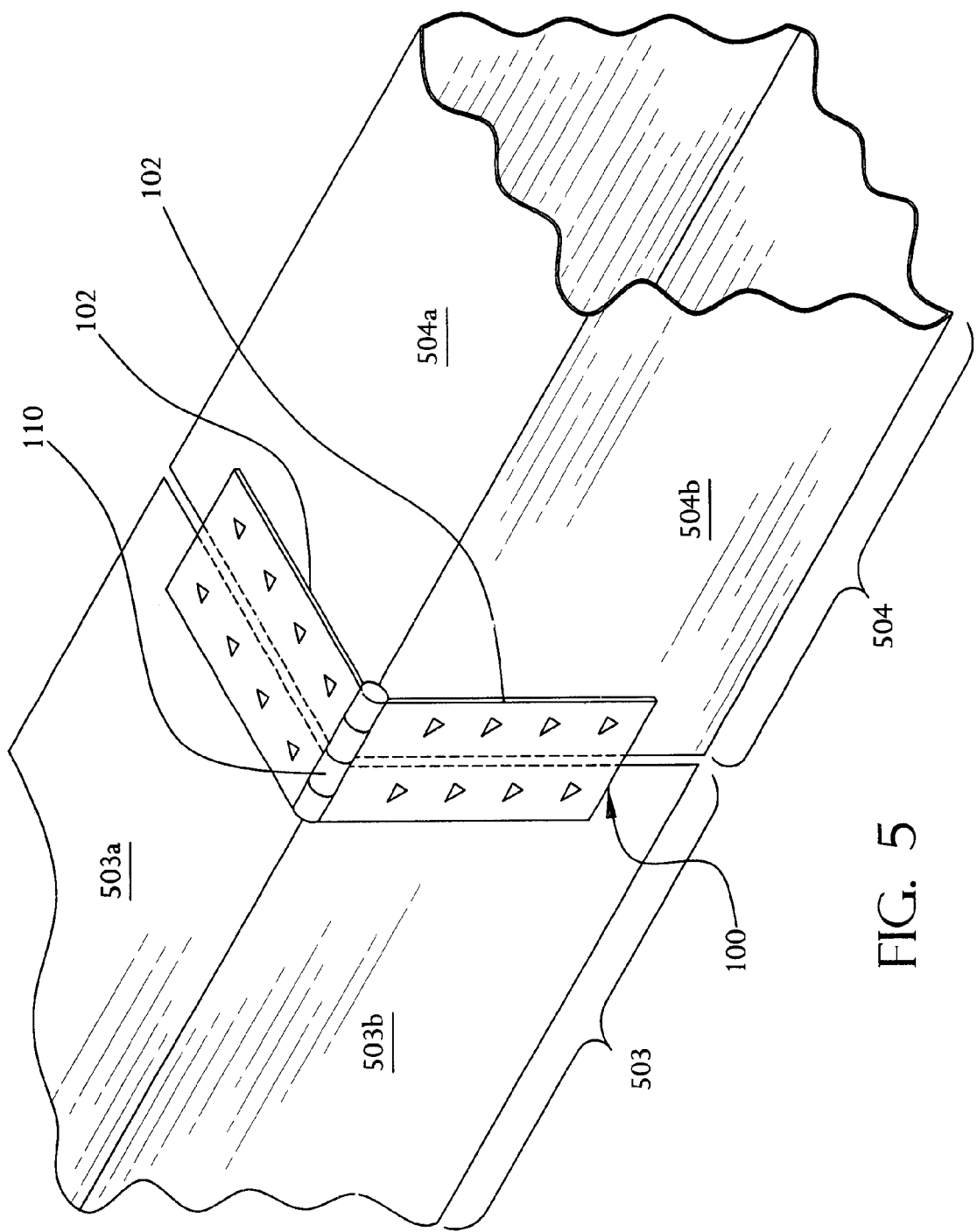

METHODS AND DEVICES FOR JOINING PANELS

FIELD OF THE INVENTION

The present invention is directed to methods and devices for joining panels.

BACKGROUND OF THE INVENTION

Panels of sheet material, such as material used for forming walls or ducts, can be joined in a variety of ways. In making ducts, sheet material is commonly joined together using duct tape. For example, ducts made of sheet metal are frequently made by folding sheet metal into a desired shape, and taping the folded metal to maintain the shape. Two adjacent duct sections can also be joined using tape. Tapes used in making, joining and fastening ducts include pressure-sensitive aluminum foil tapes, heat-activated tapes, and glass fabric tapes.

For some applications, such as when noise is sought to be minimized, ducts can made of materials other than sheet metal, such as fibrous glass sheet material or foam sheet material. Fibrous glass ducts can also provide improved efficiency due to advantageous thermal properties, and can exhibit less condensation than sheet metal ducts. Fibrous glass ducts can be made from sheets of resin-bonded glass fibers. Ducts can be formed by folding the sheets into square, rectangular or other multi-sided tubes. Formation of a duct by folding a sheet of material results in a longitudinal seam, i.e. a seam along the length of the duct, that can be sealed by stapling, by taping around the outer surface of the duct, or by male and female shiplap edges. Sections of duct can be joined together in the same manner.

While tape is a convenient way of joining folded board or metal to make ducts or to join adjacent lengths of duct, tape may not provide sufficient strength, and tape adhesives can deteriorate over time, causing the tape to fall away from the duct. To overcome some of the disadvantages of tape, it may be desirable to utilize a metal clamp to form or secure ducts. In addition, it may be desirable to provide a means for hanging duct work that is integral to a metal clamp used to form the duct work. Clamp assemblies for forming and hanging ducts are available; however they can be costly and/or complex.

A need remains for new and/or improved means for making, fastening or securing ducts.

SUMMARY OF THE INVENTION

One aspect of the invention provides a fastener that includes two contiguous planar members, each planar member having teeth-like projections thereon, which are integral with the planar member.

The invention provides fasteners that can be used to join multiple panels, or sections of panels or sheets, of a wide variety of materials. The fasteners of the invention do not have the disadvantages of adhesives that can deteriorate or tape that may not be sufficiently strong for some applications.

Another aspect of the invention provides a method for joining a first duct section and a second duct section. The method includes providing a fastener, which includes a first planar member and a second planar member, the first and second planar members being contiguous and having teeth-like projections thereon, and contacting the first duct section with the fastener such that at least one of projections on one of the planar members at least partially penetrates the first duct section; and contacting the second duct section with the fastener such that the at least one of the projections on the other planar member at least partially penetrates the second duct section.

Another aspect of the invention provides a method for joining a first panel and a second panel, by providing a fastener that includes a first planar member and a second planar member, the first and second planar members being contiguous and having teeth-like projections thereon which are integral with the planar member; contacting the first panel with the first planar member such that the projections on the first planar member at least partially penetrate the first panel; and contacting the second panel with the second planar member such that the projections on the second planar member at least partially penetrate the second panel.

A further aspect of the present invention provides a duct formed by joining at least three panels. The panels are joined by a plurality of fasteners, each fastener having at least two contiguous planar members and each planar member having teeth-like projections thereon. The teeth-like projections penetrate at least partially into the panels, and the panels together form the duct.

Another aspect of the invention is a system of at least a first duct segment and a second duct segment, the first and second duct segments being joined by at least one fastener. Each fastener comprises at least one planar member, and each planar member has teeth-like projections thereon. The planar members are joined to one another, such that at least one of the projections at least partially penetrates the first duct segment and at least one of the projections at least partially penetrates the second duct segment.

A further aspect of the invention is a method for forming a duct. The method includes the steps of providing a sheet of material having a first longitudinal edge and a second longitudinal edge; folding the sheet of material in a direction parallel to the longitudinal edges so that the longitudinal edges are brought into contact and form a longitudinal seam; and applying to the folded sheet, across the longitudinal seam, a fastener having two adjacent planar members, each of which planar member has teeth-like projections thereon. The projections are integral with the planar member, and the planar members are joined to one another such that at least one of the projections at least partially penetrates the first longitudinal edge, and at least one of the projections at least partially penetrates the second longitudinal edge.

These and other aspects of the invention will become apparent in view of the following disclosure, the drawings, and the appended claims.

BRIEF DESCRIPTION OF THE DRAWINGS

FIG. 5 is a front perspective view of two duct segments joined by the exemplary fastener of FIG. 1.

DETAILED DESCRIPTION

This invention relates to new devices and methods for joining panels together. The devices are useful for joining panels made of sheet material, such as those used for walls or ducts.

The methods and devices of the present invention are useful for joining materials that are at least partially penetrable by projections that are, in some embodiments, integral to the fasteners of the invention. Sheet materials for which the devices and methods of the present invention are useful include materials made from glass fibers, foam materials, composite materials, plasterboard, cardboard, wood fiber board, and drywall board. For ducts, glass fiber board and sheets made of foam are preferred. Foams suitable for use in making ducts include polyurethane foams, phenolic foams, and foams of the type described in U.S. Pat. No. 5,918,644, which is hereby incorporated herein by reference in its entirety.

Figure 1:
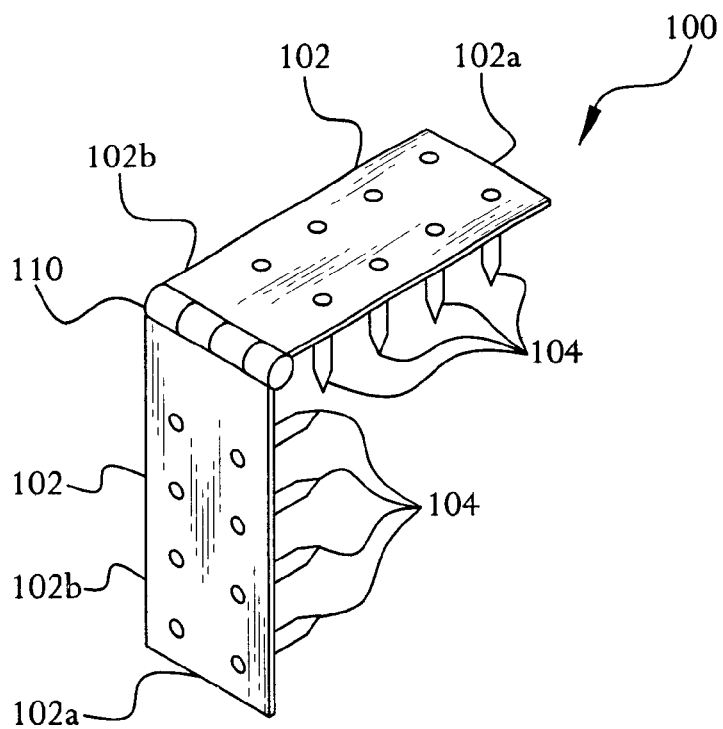
FIG. 1 front perspective view of a first exemplary fastener according to the invention.

FIG. 1 shows an embodiment of the invention wherein a fastener comprises two planar members 102 pivotally joined by a hinge 110. The hinge 110 allows the planar members 102 to be rotated to vary the angle between the planar members. Also shown are projections 104 that are integral to the planar members 102.

Figure 4:
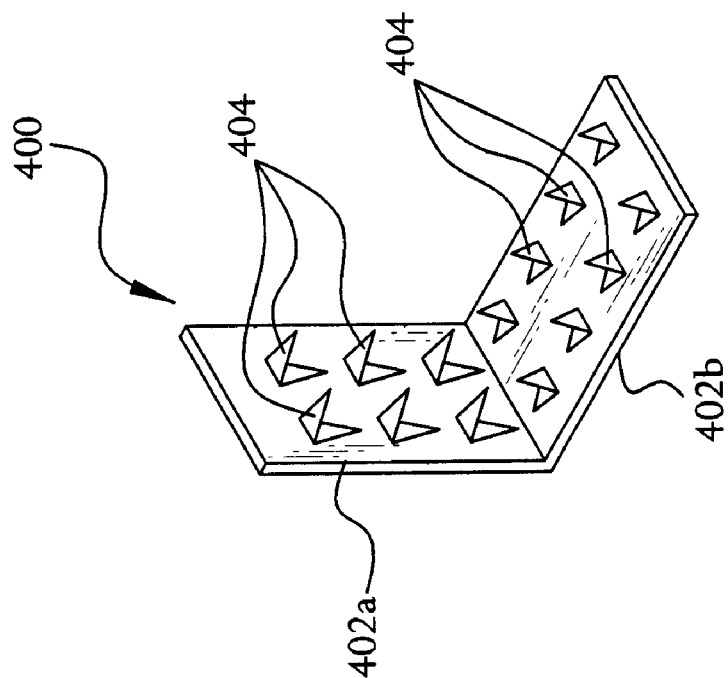
FIG. 4 is a front perspective view of a fourth exemplary fastener according to the invention.

The fastener 100 of FIG. 1 comprises two contiguous planar members 102. The term "contiguous", as used herein, means that the planar members 102 are connected to one another, or are unitary (as shown in FIG. 4). Planar members 102 each include at least one projection 104 and preferably a plurality of projections 104. The projections 104 can be made in the planar members 102 by any method known to those skilled in the art for punching, perforating or cutting a material such as steel, aluminum or brass. The projections 104 protrude from the surface of the planar member 102, preferably in a substantially perpendicular direction with respect to the planar member 102. The projections 104 also preferably have a shape that facilitates insertion of the projections into a panel, such as a triangular shape or any sharp shape, preferably one that terminates substantially in a point. If desired, the end of one or all of the projections may be sharpened to a point.

Instead of projections from the planar members, or in addition thereto, this invention contemplates the use of supplemental fasteners, such as nails or screws, that can be passed through the planar members, with or without pre-placed holes in the planar members. Alternatively, or additionally, tape such as pressure-sensitive and/or two-sided tape, can be applied to the duct-facing side of the planar members for adhesive attachment to duct work, or tape and/or adhesive can be applied during installation.

As implied by the name, the planar members 102 of the fasteners 100 of FIG. 1 are preferably substantially smaller in thickness than in length and width, and can be broadly described according to a two-dimensional shape defined by their length and width. For example, the shape of the planar members 102 can be square, rectangular, or oblong. Preferably, the planar members 102 have a rectangular shape, with two relatively shorter sides 102a and two relatively longer sides 102b. For convenience, the two relatively shorter sides 102a can be referred to as the "ends" of the planar members. The planar members 102 are preferably made of a material that is sufficiently sturdy to provide strength to panels joined by the devices, but that permits the formation of projections therein. Preferred materials are aluminum, steel, galvanized steel, copper, brass and other metals and alloys suitable for fasteners.

In some preferred embodiments, the two contiguous planar members 102 of the fastener are connected to one another at their ends. For example, in FIG. 1, the planar members 102 may be connected to one another, for example, pivotally through a hinge 110. The hinge 110 can be a mechanical hinge having a pair of interlocking hinge halves connected by a pin, or a flexible sheet of material, such as a polymer, glass mesh, cardboard, or fabric which can be bonded to the planar members 102.

Figure 2:
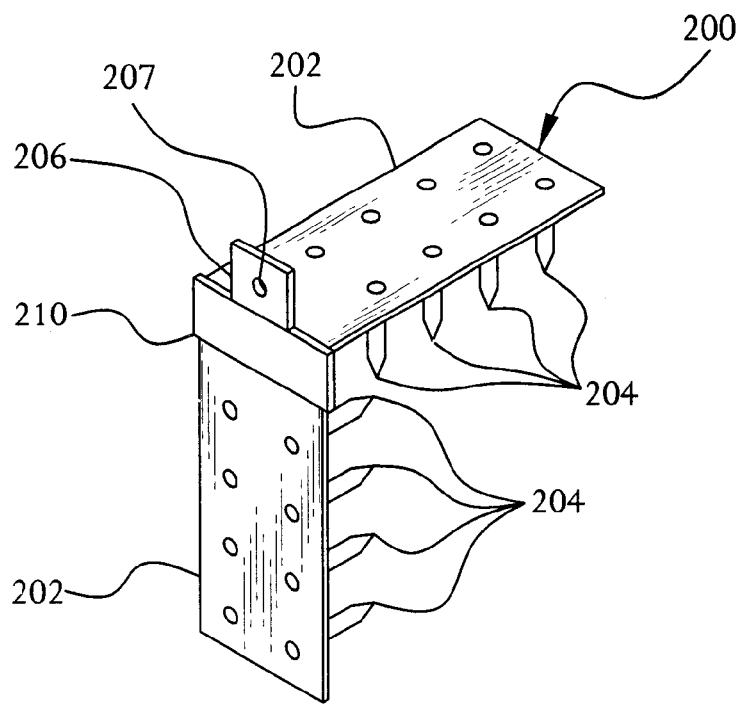
FIG. 2 a front perspective view of a second exemplary fastener according to the invention.

FIG. 2 shows an embodiment of the invention wherein a fastener comprises two planar members 202 joined by means of a tongue and groove joining 210. Also shown is a tab 206 extending from one of the planar members. The tab 206 has a hole 207 therein, which can be used, for example, for hanging to a support beam.

FIG. 2 shows a hanging means in the form of a tab 206. In some applications, such as when the devices of the invention are used to form a duct or to join duct sections, it may be desirable to hang or mount the duct or ducts. For example, it may be desirable to suspend a duct from ceiling joists or rafters. To facilitate hanging, the fastener 200 may have a tab 206 extending from them. The tab 206 may have a hole 207, slot, hook, grommet, loop or the like in order to accommodate a hanger, strap, rod, or wire. Other equivalent hanging means may be included.

Figure 3:
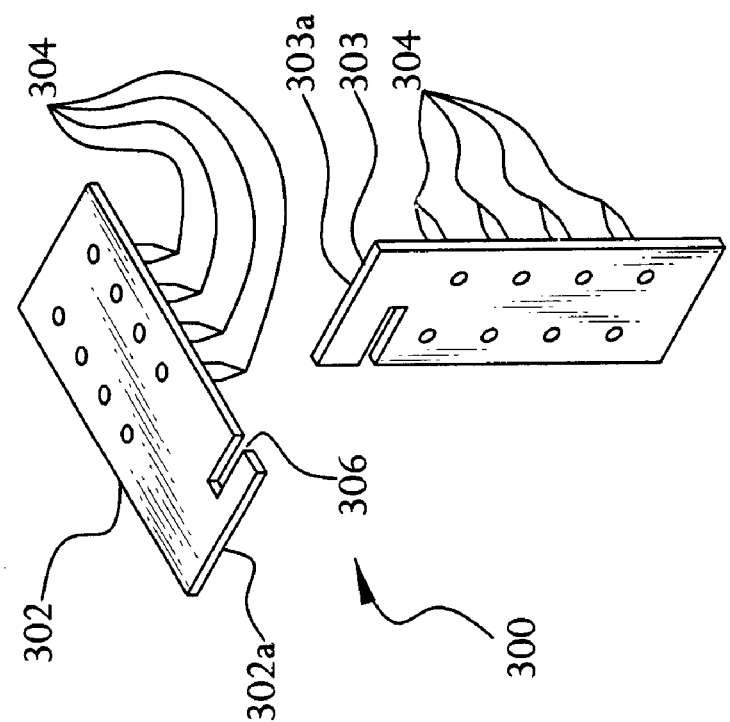
FIG. 3 is front perspective, exploded view of a third exemplary fastener according to the invention.

FIG. 3 shows an embodiment of the invention having two planar members 302 and 303, wherein each planar member has a respective slot 306 and 307 therein. The slots 306 and 307 can be used to attach the planar members 302 and 303 together by interconnecting the slots. Also shown are the projections 304 in the planar members 302 and 303, as described above.

FIG. 4 shows an embodiment of the invention having two planar members, wherein the planar members are integrally formed from a single piece of material. The material has been bent to approximately a 90 degree angle.

As shown in FIG. 4, the planar members 402a and 402b are unitary. When the planar members 402a and 402b of a fastener are formed by bending a single piece of material, the angle at which the material is bent is determined by the angle between panels (not shown in FIG. 4) that are to be joined together. For example, when four panels are to be joined together, it may be desirable to join them at right angles so that a piece of material to be bent to form two planar members 402a and 402b is bent at approximately a 90 degree angle. Alternatively, when three panels are to be joined together, it may be desirable to utilize three fasteners, the planar members 402 of which are each formed by bending a single piece of material at an angle of about 60 degrees. As can be recognized by one skilled in the art, any number of panels, such as 5, 6, 7, or 8, may be joined together, with the angle between the planar members of the fasteners depending in part upon the number of panels. Such variations in the number of panels to be joined and the angles between the planar members of the fasteners apply equally to all embodiments of the fasteners, regardless of whether the planar members 402 are joined to one another by a hinge, slot, or other means.

Panels to be joined together using the methods and fasteners of the invention can be separate sheets of material, or can be portions of a single sheet of material that is folded. Either separate sheets of material or a folded single sheet of material can be used to form a duct; however, a folded single sheet of material is generally preferred for forming a duct. "Separate sheets of material", as used herein, also includes separate duct sections, i.e. separate lengths of duct that can be joined together using the methods and devices of the present invention.

In FIG. 5, two duct sections 503 and 504 are shown, joined together by a fastener 100 of the type shown in FIG. 1. The planar members 102 are joined by hinge 110. In the configuration shown in FIG. 5, the fastener 100 performs two functions. First, the fastener 100 joins duct sections 503 and 504 to each other. Second, the fastener 100 joins sheet (or side) 503a to sheet (or side) 503b. Similarly, fastener 100 joins sheet (or side) 504a to sheet (or side) 504b.

In embodiments where the fasteners according to the invention are used to join ends of a folded sheet of material together, such as when a sheet of material is folded to form a tube or duct, the angle between the planar members will depend upon the shape into which the sheet of material is folded.

In embodiments where the fasteners of the invention are used to join duct sections together, the angle between the planar members depends upon the shape of the duct sections. Two or more such duct sections when joined together can be referred to as "duct systems" or "duct work".

When joined together using the devices and methods according to the present invention, three or more panels may be used to form a duct or tube. In a duct or tube, the panels may define a wide variety of two dimensional shapes in a plane perpendicular to the joined panels. Such shapes include, but are not limited to, triangles, rectangles, parallelograms, pentagons, hexagons, heptagons, octagons and the like. For many applications, formation of ducts or tubes from panels defining rectangles, including squares, are preferred.

In some embodiments, as few as two panels may be joined together using a device of the present invention. In such embodiments, rather than forming a duct or tube, two panels may form a channel or receptacle.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A fastener comprising two contiguous planar members, each planar member having teeth-like projections thereon which are integral with the planar member, and wherein each planar member has a slot and wherein said members are joined by interconnecting said slots.

2. The fastener of claim 1 wherein at least one of said first and second planar members has a mounting tab extending therefrom for mounting said fastener to a mounting surface.

3. The device of claim 2 wherein said contiguous planar members are joined by hinge.

4. The device of claim 2 wherein each planar member has a slot and wherein said members are joined by interconnecting said slots.

5. The device of claim 2, wherein said members are integrally formed from a single piece of material.

6. The device of claim 2 wherein said tab has a hole therethrough.

7. The device of claim 1 wherein said planar members form a 90 degree angle with respect to each other.

8. The device of claim 1 wherein said projections extend in a direction substantially perpendicular to said planar members.

9. A method for joining a first panel and a second panel comprising the steps of:
providing a fastener comprising a first planar member and a second planar member, said first and second planar members being contiguous and having teeth-like projections thereon, and wherein at least one of said planar members has a mounting tab extending therefrom for mounting said fastener to a mounting surface;
contacting said first panel with said first planar member such that said projections on said first planar member at least partially penetrate said first panel; and
contacting said second panel with said second planar member such that said projections on said second planar member at least partially penetrate said second panel.

10. The method of claim 9 wherein said panels form duct sections.

11. The method of claim 9 wherein said panels comprise glass fibers.

12. The method of claim 9 further comprising joining said joined panels to two additional panels, said additional panels joined to each other by a fastener comprising two adjacent planar members, each planar member comprising teeth-like projections thereon, said projections integral with said member, and said planar members joined to one another, such that said two joined panels and said two additional panels together form a walled tube defined by said panels.

13. A duct system comprising at least a first duct segment and a second duct segment, said first and second duct segments joined by at least one fastener comprising two adjacent planar members, said planar members comprising teeth-like projections thereon, and wherein said planar members are contiguous to one another, such that at least one of said projections at least partially penetrates said first duct segment and at least one of said projections at least partially penetrates said second duct segment.

14. The duct system of claim 13, wherein each planar member is attached to two duct segments.

15. A duct formed by joining at least three panels, by applying to said panels a plurality of fasteners, each fastener comprising at least two contiguous planar members, each planar member comprising teeth-like projections thereon, whereby said projections penetrate at least partially into said panels, and wherein at least one of said planar members has a mounting tab extending therefrom for mounting said fastener to a mounting surface, said panels together forming said duct.

16. A method for forming a duct comprising the steps of:
providing a sheet of material having a first longitudinal edge and a second longitudinal edge;
folding said sheet of material in a direction parallel to said longitudinal edges so that said longitudinal edges are brought into contact and form a longitudinal seam; and
applying to said folded sheet, across said longitudinal seam, a fastener comprising two adjacent planar members, each planar member comprising teeth-like projections thereon, said projections integral with said member, and said planar members contiguous to one another, such that at least one of said projections at least partially penetrates said first longitudinal edge and at least one of said projections at least partially penetrates said second longitudinal edge, and wherein at least one of said planar members has a mounting tab extending therefrom for mounting said fastener to a mounting surface.

17. A method for joining a first panel and a second panel comprising the steps of:
providing a fastener comprising a first planar member and a second planar member, said first and second planar members being contiguous and having teeth-like projections thereon, and wherein each planar member has a slot and wherein said members are joined by interconnecting said slots;
contacting said first panel with said first planar member such that said projections on said first planar member at least partially penetrate said first panel; and contacting said second panel with said second planar member such that said projections on said second planar member at least partially penetrate said second panel.

18. A method for forming a duct comprising the steps of:
providing a sheet of material having a first longitudinal edge and a second longitudinal edge;
folding said sheet of material in a direction parallel to said longitudinal edges so that said longitudinal edges are brought into contact and form a longitudinal seam; and
applying to said folded sheet, across said longitudinal seam, a fastener comprising two adjacent planar members, each planar member comprising teeth-like projections thereon, said projections integral with said member, and said planar members contiguous to one another, such that at least one of said projections at least partially penetrates said first longitudinal edge and at least one of said projections at least partially penetrates said second longitudinal edge, and wherein each planar member has a slot and wherein said members are joined by interconnecting said slots.

19. A duct formed by joining at least three panels, by applying to said panels a plurality of fasteners, each fastener comprising at least two contiguous planar members, each planar member comprising teeth-like projections thereon, whereby said projections penetrate at least partially into said panels, and wherein each planar member has a slot and wherein said members are joined by interconnecting said slots.

* * * * *